United States Patent [19]

Sanda, Jr.

[11] Patent Number: 5,295,525

[45] Date of Patent: Mar. 22, 1994

US005295525A

[54] PUNCTURE SEALANT FORMULATION

[75] Inventor: Joseph C. Sanda, Jr., Taylors, S.C.

[73] Assignee: Michelin Recherche et Technique S.A., Fribourg, Switzerland

[21] Appl. No.: 902,200

[22] Filed: Jun. 22, 1992

[51] Int. Cl.$^5$ .................. B60C 19/12; B29C 73/16
[52] U.S. Cl. ........................... 152/503; 106/33
[58] Field of Search .............. 152/152, 502–508; 156/97, 115; 106/33

[56] References Cited

U.S. PATENT DOCUMENTS

| | | |
|---|---|---|
| 3,981,342 | 9/1976 | Farber et al. |
| 4,064,922 | 12/1977 | Farber et al. |
| 4,426,468 | 1/1984 | Ornum et al. ................. 152/502 |
| 4,616,048 | 10/1986 | De Trano et al. ............. 152/503 |
| 4,913,209 | 4/1990 | Hong et al. |
| 4,966,213 | 10/1990 | Kawaguchi et al. ........... 152/504 |
| 5,085,942 | 2/1992 | Hong et al. ................... 152/504 |

FOREIGN PATENT DOCUMENTS 1083288   8/1980   Canada ................. 152/504

*Primary Examiner*—Michael W. Ball
*Assistant Examiner*—Nancy T. Krawczyk
*Attorney, Agent, or Firm*—Alan A. Csontos; Richard H. Thomas

[57] ABSTRACT

The present invention resides in a sealant composition for pressurized articles, and in the articles comprising the sealant. The present invention is particularly useful as a sealant for high pressure tires, adapted for pressures higher than 50 psig. The sealant of the present invention comprises a high molecular weight elastomer, a low molecular weight liquid elastomer, and a cross-linking agent. The low molecular weight liquid elastomer is substantially free of iron.

14 Claims, No Drawings

PUNCTURE SEALANT FORMULATION

BACKGROUND OF THE INVENTION

1. Technical Field

The present invention relates to sealant formulations useful for sealing punctures in pressurized items. The present invention is particularly useful for sealant formulations for relatively high pressure tubeless tires. The present invention also resides in a tubeless tire, especially a high pressure tubeless tire, comprising the sealant of the present invention.

2. Description of the Prior Art

U.S. Pat. No. 3,981,342 discloses a puncture sealing composition for a pneumatic tubeless tire. The composition comprises a high molecular weight elastomer, a low molecular weight liquid elastomer, and a cross-linking agent to partially crosslink the elastomers. The low molecular weight liquid elastomer used in the examples is a heat depolymerized natural rubber marketed by Hardman Company under the trademark DPR-400. Samples of DPR-400 were analyzed, for purposes of comparison in the present invention, and were found to contain relatively large amounts of iron, some samples ranging by way of example from 25 to 2,500 parts per million (ppm) iron. The patent also mentions that other low molecular weight liquid elastomers can be used, such as cis-polyisoprene polymerized to a low molecular weight, liquid polybutadiene, liquid polybutene, liquid EPDM, and liquid butyl rubber. However, no trademarked examples are given of these other low molecular weight liquid elastomers, or of their use.

U.S. Pat. No. 4,064,922 also discloses a puncture sealing composition for a pneumatic tubeless tire. The composition comprises a high molecular weight elastomer, a low molecular weight liquid elastomer, and a cross-linking agent to partially crosslink the elastomers. The low molecular weight liquid elastomer used in mos of the Examples is the same heat depolymerized natural rubber marketed by Hardman Company under the trademark DPR-400. A preferred cross-linking agent is a titanate ester. The patent also contains Examples in which the low molecular weight liquid elastomer is Butyl LM 430 marketed by Enjay. This is a liquid polyisobutylene having an average molecular weight of 32,000. The composition has low unsaturation (about 4 mole percent).

U.S. Pat. No. 4,913,209 discloses a puncture sealing composition for a pneumatic tubeless tire. The composition comprises a high molecular weight elastomer, a low molecular weight liquid elastomer, and a cross-linking agent to partially crosslink the elastomers. The low molecular weight liquid elastomer disclosed in the examples is the depolymerized natural rubber marketed by Hardman Company under the trademark DPR-400. The sealant is a laminate sealant in that it is applied to a web for a tire, prior to curing, and then is cured with the tire in the tire curing process. A preferred cross-linking agent is a quinoid curing system, such as p-quinone dioxime, or an organic peroxide or hydroperoxide, such as dicumylperoxide.

SUMMARY OF THE INVENTION

The present invention resides in a sealant formulation for a pressurized article such as a tubeless tire. The sealant formulation comprises a high molecular weight elastomer, a low molecular weight liquid elastomer, and a cross-linking agent. The present invention resides in the discovery that reduced rotary flow of the sealant, following cure, is achieved by using a low molecular weight liquid elastomer which is substantially free of iron.

Preferably, the low molecular weight liquid elastomer has less than 10 parts per million (ppm) iron.

A preferred sealant formulation is one in which a portion of the low molecular weight elastomer is chemically modified so as to have reactive groups, and the crosslinking agent is a titanate ester reactive with the reactive groups of the low molecular weight elastomer. The titanate ester cross-linking agent is preferably used in the amount of 2 to 10 parts per hundred (phr) rubber.

Examples of reactive groups which are reactive with the titanate ester are hydroxyl groups, carboxyl groups, and amino groups.

Preferred low molecular weight elastomers are a heat depolymerized liquid polyisoprene which has been processed so that it is substantially free of iron, and a synthetic liquid cis-polyisoprene which has been polymerized to a low molecular weight and also is essentially free of iron.

Another preferred cross-linking agent in the practice of the present invention is a peroxide. A sulfur curing agent can also be used. A preferred low molecular weight elastomer, for use with a sulfur curing agent, is one having a high mole percent unsaturation.

Other low molecular weight liquid elastomers that can be used in the present invention, when processed to have less than 10 ppm iron are, a liquid polybutadiene; a dipolymerized liquid butyl rubber; and a liquid ethylenepropylene terpolymer (EPDM).

The present invention also resides in a tire comprising a sealant obtained by curing the sealant formulation of the present invention. The present invention resides in particular in a high pressure tire, for instance, one adapted for pressures of more than 50 psi.

DESCRIPTION OF PREFERRED EMBODIMENT

The high molecular weight elastomer of the present invention can be any high molecular weight elastomer capable of being cross-linked. Examples are the highly unsaturated rubbers such as those based on conjugated diolefins, whether homopolymers as in polyisoprene (particularly cis-polyisoprene, whether natural or synthetic), polybutadiene (including polybutadiene of high cis content), polychloroprene (neoprene), or copolymers as exemplified by those having a major proportion of such conjugated dienes as butadiene with a minor proportion of such monoethylenically unsaturated copolymerizable monomers as styrene or acrylonitrile. Alternatively, elastomers of low unsaturation may be used, notably butyl type rubbers (copolymers of such isoolefins as isobutylene with small amounts of conjugated dienes such as isoprene), or the EPDM types (copolymers of at least two different monoolefins such as ethylene and propylene with a small amount of a non-conjugated diene such as di-cyclopentadiene, 1,4-hexadiene, 5-ethylidene-2-norbornene). Even saturated elastomers such as EPM or ethylene-vinyl acetate may be employed, using the proper cure system. The elastomer may be emulsion-prepared or solution-prepared, stero specific, or otherwise. The molecular weight of the solid elastomer is usually in excess of 50,000, ordinarily within the range of 60,000 to two or three million or more. Ordinarily, the solid elastomeric component has a Mooney viscosity within the range of from 20 to 160 ML-4 at 212° F.

The low molecular weight liquid elastomer of the present invention is one that is processed so that it is essentially free of iron, preferably one having an iron content of less than 10 ppm. In the manufacture of low molecular weight elastomers, it is possible for the elastomers to pick up iron, for instance from equipment or catalyst contamination. By way of example, samples of a depolymerized natural rubber, such as DPR-400(a depolymerized natural rubber in liquid form having a Brookfield viscosity of 3000 to 5000 poise at 38° C. and a Gel Permeation Chromatograph molecular weight average (Mw of 80,000), marketed by Hardman Company, used in Examples of the above-mentioned patents, were analyzed for iron content and were found to have from about 25 to 2,500 ppm iron, depending upon the sample analyzed. One sample in particular had an iron content of 150 ppm. Another sample had an iron content of 2,500 ppm. The presence of the iron in the depolymerized natural rubber may be due to the depolymerization process which was used, the iron entering into the composition in the course of the depolymerization. The iron may also be contamination from the source of the natural rubber. It was found, in accordance with the present invention, that the presence of iron in the low molecular weight elastomer can adversely affect the properties of the sealant by adversely affecting the oxidative stability of the sealant.

Since a major component of the sealant of the present invention is a depolymerized natural rubber, or a liquid synthetic rubber of equivalent properties, one would not expect the oxidative stability of the sealant t be critical. Surprisingly, it was found that by improving the oxidative stability of the sealant, reduced rotary flow of the sealant was obtained, as well as better tackiness and better sealing performance. Improved oxidative stability was found to be particularly important for high pressure applications.

An object of the present invention is to provide a sealant which is useful for high pressure tires, for instance tires adapted for pressures above 50 psi, for instance up to 85 psi. Oxidative instability, as evidenced by increased rotary flow, or reduced tackiness and sealing performance, significantly manifests itself in a conventional 30–40 psi tire. However, it was found, in the present invention, that in the case of tires adapted for higher pressures e.g., 50-85 psi, the effect of oxidative instability manifests itself even more, and the oxidative stability becomes very important.

Normally, the low weight molecular liquid elastomer will have a molecular weight in the range of 1,000 to 100,000. The low molecular weight elastomer may be chemically modified and may comprise reactive groups in the molecule, preferably 2 to 10 reactive groups per molecule. Preferred reactive groups are carboxyl, hydroxyl, and amino radicals.

One preferred low molecular weight elastomer is a depolymerized natural rubber which is processed so that it is essentially free of iron. One such elastomer is a depolymerized polyisoprene marketed by the Hardman Company under the trademark "ISOLENE 400". This material typically is a liquid, has a molecular weight of about 90,000 and 92% unsaturation. Its viscosity in poises, at about 38° C., is 3,000–5,000. Samples of the "ISOLENE 400" were analyzed and typically were found to have an iron content in the rang of about 1.8 to 5.4 ppm. The "ISOLENE 400" also had low contents of such metals as copper and manganese. One analysis of "ISOLENE 400" showed it to have a relatively high hydroxyl number, about 0.87. The compound is not marketed as one having terminal hydroxyl groups. However, it may in fact have such groups which may enter into the reaction with the cross-linking agent which is used, for instance, a titanate ester.

Another preferred low molecular weight liquid elastomer is a synthetic cis-polyisoprene which is polymerized to a low molecular weight. A preferred such elastomer is one marketed by Kuraray Co., Ltd. under the trademark "LIR-403". This compound has an average molecular weight of 25,00a Melt viscosity of 980 poise at 38° C., and was found, on analysis, to have about 1.8-2 ppm iron average. It is chemically modified and has three reactive sites (carboxyl groups) per molecule. Its iodine number is 368.

It is also possible to use a low molecular weight synthetic cis-polyisoprene which has not been chemically modified. One such compound is marketed by Kuraray Co., Ltd. under the trademark "LIR-50". This compound has an average molecular weight of 47,000a Melt viscosity of 4,800 poise at 38° C., and was found, on analysis, to have about one ppm iron average. Being a synthetic cis-polyisoprene, it has a 100% mole unsaturation. Although this compound is sold as one which has no functional groups, or has not been chemically modified, an analysis of the compound showed that it may have some hydroxyl groups in the molecule. This may, as with the "ISOLENE 400", aid in the reaction with the cross-linking agent.

In two of the following Examples, Examples 2 and 3, "LIR-50" was used by itself and good results were obtained. However, in the following Example 5, "LIR-50" was used with a small amount (5%) of the chemically modified "LIR-403", and even better results were obtained. This was with a titanate cure system. Thus, another preferred low molecular weight elastomer composition, in the practice of the present invention, is a blend in which a small portion of the blend is a synthetic cis-polyisoprene which is chemically modified.

It is possible for a chemically modified cispolyisoprene to be too reactive with a titanate cure system. For instance, it is believed that a compound such as "LIR-410"(having a molecular weight of 25,000 and a Melt viscosity of 1,800 poise at 38° C.), also marketed by Kuraray Co., Ltd., which is carboxylated and has ten (10) carboxyl groups per molecule, may be too reactive, in a titanate cure system, even if added in only a small amount to a non-chemically modified cis-polyisoprene such as "LIR-50". Carboxyl groups are more reactive than hydroxyl groups.

It is also possible, in accordance with the present invention, to use a liquid EPDM, marketed by Uniroyal Chemical Co., Inc. under the trademark "TRILENE 67". This compound has a molecular weight of about 6,000 and a Brookfield viscosity of 500,000 centipoises at 60° C. The compound is a copolymer of ethylene and propylene, copolymerized with ethylidene norbornadiene. It has an iodine number of 19.

It is also possible to use a liquid polybutene marketed by Hardman, Company under the trademark "KALENE 260". This compound is a high viscosity liquid rubber, and was found to have 1.8 ppm iron.

Another low molecular weight liquid elastomer which can be used in the practice of the present invention is a liquid, synthetic, depolymerized butyl rubber marketed by Hardman Company under the trademark "KALENE 800". This compound has a molecular weight of about 36,000 Brookfield viscosity of 8,000 to 11,500 poise at 66° C., and was found to have less than 4½ ppm iron. The compound has a low percent unsaturation and few reactive sites. However, it reacts well with a titanate cure system.

The Hardman Company also markets a synthetic, liquid, depolymerized butyl rubber under the trademark "KALENE 1300" which can be used. This compound has a molecular weight of 42,000 and a Brookfield viscosity of 11,500 to 15,000 poise at 66° C. However, as with "KALENE 800", this compound has few reactive sites, and a low percent unsaturation. However, "KALENE 1300" also functions well with a titanate cure system. This compound has an average molecular weight of 42,000.

Although the emphasis in the above description has been on low free iron, other metals such as copper and manganese, if present, can also cause oxidative instability as well. It is important that the content of these metals also be low. "DPR 400" was analyzed and found to have about 2.8 to 3.3 ppm copper and 8 to 10 ppm manganese. In contrast, "ISOLENE 400" was found, on analysis, to have only about 0.4 ppm copper and 0.06 ppm manganese. Similarly, "LIR-50" was found to have only 0.4 ppm copper and 0.08 ppm manganese. "KALENE 260" was found to have only 0.4 ppm copper and 0.07 ppm manganese. "KALENE 800" was found to have only 0.6 ppm copper and 0.1 ppm manganese.

A preferred cross-linking agent in the practice of the present invention is a tetrahydrocarbyl titanate ester of the formula $(RO)_4Ti$ where R is a hydrocarbyl group, such as an alkyl group, e.g., an alkyl group having 1 to 12 carbon atoms, preferably 3 to 8 carbon atoms, or an aryl group having 6 to 10 carbon atoms, such as cresyl.

When a titanate ester is added to the blend of high molecular weight elastomer and low molecular weight elastomer of the present invention, cure of the mixture is accompanied by the evaporation of alcohol, corresponding to the alkoxy portion of the titanate ester. Titanate esters of lower boiling alcohols effect a cure more rapidly than titanate esters of higher boiling alcohols. For instance, isopropyl titanate affects a more rapid cure than butyl titanate. An advantage in the use of a titanate ester cross-linking agent is that the cure proceeds even at room temperature. In general, from one to ten days are required for room temperature cure. If desired, the cure of the sealant can be effected even more rapidly by the application of heat, for instance, by storing the tires, after application of the sealant, in a warm room at 50°-100° F. At such temperatures, the sealant layer becomes sufficiently cross-linked in one to five days to perform the sealing function. However, the less heat that a tire is exposed to, the better. An advantage in the use of the titanate ester is that the cure can be carried out without the application of an heat.

Another advantage is that if the sealant is hermetically sealed to prevent evaporation of the alcohol, it will remain uncured when stored for as long as a week at 250° F.

In the cure with a titanate ester, the ester cross-links with both the low and high molecular weight elastomers. With respect to the low molecular weight elastomer, the titanate ester cross-links with the polymer chain of the elastomer, but also with carboxyl, hydroxyl, or amino groups that may be present. Thus, the best results in the practice of the present invention are achieved when the low molecular weight elastomer has at least some free reactive groups.

It is also possible to employ as the cross-linking agent a sulfur curing system such as those based on sulfur or sulfur-yielding materials (e.g., tetramethyl thiurem disulfide) and conventional accelerators of sulfur vulcanization; quinoid curing systems such as p-quinone dioxim (marketed by Uniroyal Chemical under the trademark "GMF") with or without a supplementary oxidant; organic peroxides (or hydroperoxides) such as dicumyl peroxide, cumene hydroperoxide, methylethylketone hydroperoxide or other radical generating catalyst such as azobisisobutyronitrile; and polyisocyanates such as MDI (4,4'-methylene bisphenyleneisocyanate). TDI (toluene diisocyanate), and PAPI (polymethylene polyphenyl isocyanate) as well as dimers and trimers of MDI and TDI can also be used. A significant level of unsaturation is important for a sulfur cure system, and to some extent with a peroxide cure system. Depolymerized natural rubber and synthetic cis-polyisoprene both have the level of unsaturation desired for use with a sulfur or peroxide cure system.

The sealant composition of the present invention preferably contains a major proportion, that is, between more than 50% and 90% by weight, of total low molecular weight elastomer based on the weight of the two elastomers. The amount of cross-linking agent employed will vary with the particular elastomers employed and with their proportions, as well as with the particular cross-linking agent and the conditions of the cross-linking step. Ordinarily, the amount used is that sufficient to prevent flow of the composition in a tire at temperatures up to 200° F. and speeds up to 100 mph, while still retaining a sufficient adhesiveness and conformability to perform the desired sealant function.

With the use of a titanate ester, in general, from 2 to 10 phr (parts pe hundred rubber) of the titanate ester is added to the elastomer to be cured. Preferably the amount of the titanate ester is within the range of 2.5 to 8 phr.

If a peroxide or hydroperoxide cross-linking agent is employed (radical generating catalyst), the amount of cross-linking agent is preferably in the range of about 0.1 to 1.5 phr, preferably 0.2 to 1.1 phr. The amount of a sulfur-containing or quinoid type curative, when used, preferably is in the range of about 0.5 to 2 phr, more preferably in the range of about 0.7 to 1.5 phr.

The composition of the present invention may further include, if desired, various appropriate additional compounding ingredients, e.g., pigments such as carbon black, particulate inorganic fillers, extenders, tackifiers, stabilizers and anti-oxidants. It is undesirable to add fibrous fillers to the present compositions.

Preferably, the proportions of ingredients, primarily the high molecular weight elastomer, the low molecular weight elastomer, and the cross-linking agent, with or without a tackifier, stabilizer or anti-oxidant, give an uncured Mooney viscosity at 80° F., using a large rotor, (ML (3+4) 80° F.), of between 30 and 110, more preferably in the range of 35 to 60. Below an initial Mooney viscosity of 30, the composition tends to flow downwardly on the shoulder and side wall areas of the tire during storage before sealant cure, as well as out of a hole when the tire is punctured. Above a Mooney viscosity of 70, the sealant capability of the composition is impaired, in the titanate process. Above a viscosity of 70, a laminate process may be required.

Preferably, the ratio of elastomeric components gives a cured peak Mooney viscosity at 150° F. (the maximum reading attained, which is usually at 90 seconds of the four minute Mooney curve) of between 20 and 70 (large rotor, ML), more preferably in the range of 25 to 55, even more preferably in the range of 25 to 45. Higher values are desirable for higher pressures.

Although not to be bound by any theory, it is believed that the low molecular weight elastomer in the present invention furnishes the adhesion and flow characteristics necessary in a puncture sealant. When a puncturing object is withdrawn from the tire, the sealing composition flows into the opening left by the puncturing object. The high molecular weight elastomer functions as a supporting structure for the sealing composition. At high speeds, during hot weather, a tire can become very hot, reaching temperatures as high as 250° F. The high molecular weight elastomer resists flow of the composition, by centrifugal force, from the tire shoulders to the tire crown. Such flow could cause the tire shoulders to become unprotected. By using a low molecular weight elastomer having a low iron content, less oxidation occurs in the sealant, and the integrity of the supporting structure of the high molecular weight elastomer as well as the adhesive and flow characteristics of the low molecular weight elastomer are maintained. The presence of a highly cross-linked, oxidatively stable, low molecular weight elastomer further enhances the supporting structure of the sealant.

Tackifier or plasticizing substances which can be included in the compositions of the present invention are low molecular weight materials such as rosin esters (e.g., "STAYBELITE ESTER 10"); aliphatic petroleum hydrocarbon resins (e.g., "PICCOPALE A-70"); polyterpene resins derived from alpha-pinene (e.g., "PICCOLYTE A-10"); beta pinene (e.g., "PICCOLYTE S-25"); resins from styrene and related monomers (e.g., "PICCOLASTIC A-5"); and resins made from dicyclopentadiene (e.g., "PICCODIENE 2215"). All of the above trademarks are owned by Hercules, Inc. Other tackifiers or plasticizers that can be used are resins from the reaction of a mineral oil purification residue with formaldehyde and nitric acid catalyst according to U.S. Pat. No. 3,544,494, Schmidt et al., Dec. 1, 1970, sold under the trademark "STRUKTOL", by Struktol Co.

In practicing the present invention, the ingredients are mixed together, preferably under non-evaporative conditions in a closed system such as a "SIGMA" (trademark) blade mixer marketed by Baker-Perkins, or a closed "BRABENDER MIXER" (trademark C.W. Brabender Instruments, Inc.).

Alternatively, for instance in the case of the titanate ester, the cross-linking agent can be mixed with the elastomers in solution, in an inert volatile organic solvent such as N-hexane, preferably in the presence of a small amount of a volatile alcohol such as ethyl alcohol to suppress premature gelation. Gelation then occurs only after evaporation of the solvent and alcohol. In such instance, the mixing is carried out under conditions which suppress gelation, that is under non-evaporative conditions, and then after the mixture has been applied to a tire in desired form, is permitted to gel simply by exposing the mixture to evaporative conditions in an open atmosphere.

In order to apply a sealant layer to the interior surface of a tire, the sealant composition can be extruded into the tire in the form of a layer or strip having the desired thickness and width. For extrusion at elevated temperatures, the curative system preferably is one that does not react prematurely at the temperature of extrusion but subsequently cures the composition at a temperature higher than the extrusion temperature. The peroxide cure system is an example of this. The tetrahydrocarbyl titanate ester cur is advantageous in that the tetrahydrocarbyl titanate ester containing sealant can be extruded at an elevated temperature without premature cure, or can be extruded at room temperature. As indicated above, the cure does not take place until the alcohol (formed as a by-product of the curing reaction) escapes from the composition. If the conditions of extrusion are non-evaporative, for instance as obtained by extrusion from a barrel-type extruder, the cure does not take place, even at an elevated temperature. After the sealant composition of the present invention is applied to a tire, the alcohol is free to evaporate from the sealing layer, and the cure proceeds, even without heating.

Alternatively, the sealant of the present invention can be prepared as a strip, of suitable width and thickness, and then applied by any suitable means to the interior of a tire and adhered to the tire by means of an adhesive.

As a further alternative, the composition of the present invention can be prepared as a solvent cement, for instance as a solution in N-hexane, or other suitable volatile organic solvent, as disclosed above. This cement is then applied, for instance by spraying or brushing, over the desired area of the inner surface of a tire liner, using as many coats as required to build up a desired thickness.

Another method that can be employed in the practice of the present invention is to incorporate the sealant strip as a laminate into the tire assembly as the tire is being manufactured, as disclosed in U.S. Pat. No. 4,913,209. A strip of the sealant material is laid on the tire building drum, and then the tire liner and other carcass components are superimposed over the sealant strip. The sealant layer may be prevented from adhering to the building drum by first placing a layer of flexible release material on the drum followed by the sealant layer and the remaining components of the tire. The combined laminate is then exposed to tire-curing conditions, typically in the range of about 275° F. to about 400° F., under pressure.

When preparing a laminate sealant in accordance with U.S. Pat. No. 4,913,209, a preferred curing agent is an organic peroxide or hydroperoxide, such as dicumyl peroxide, as disclosed in U.S. Pat. No. 4,913,209. The use of a titanate cure system is generally incompatible with the laminate-type construction of a tire.

The following Examples illustrate the present invention.

EXAMPLE 1

A test sealant composition (FN 8121) was prepared containing, as the low molecular weight elastomer, a depolymerized natural rubber marketed under the trademark "ISOLENE 400". This depolymerized natural rubber was found to have a low iron content, as indicated above.

A control composition (FN 8120) was also prepared. The control composition used, as the low molecular weight elastomer, the depolymerized natural rubber marketed by the Hardman Company under the trademark "DPR-400". This composition had a high iron content, as indicated above.

The test composition and the control composition had exactly the same formulations, except for the low molecular weight elastomer that was used. The high molecular weight elastomer, in both compositions, was a blend of a medium soft natural rubber (SXR-20) and a Standard Malaysian natural rubber (SMR-5), in the ratio of 75 parts SXR-20 to 25 parts SMR-5 (by weight). The high molecular weight elastomer blend was compounded with 0.13 phr of a peptizer marketed by Bayer under the trademark "RENACIT VII" (a benzene derivative pentachlorothiophenol mixture containing kaolin, crystalline silica (quartz) and mineral oil sold by Mobay Corporation). The high and low molecular weight elastomers were blended together in the following proportions:

| High Molecular Weight Elastomer | 57.22 Parts |
|---|---|
| Low Molecular Weight Elastomer | 42.86 Parts |

The high molecular weight elastomers were premasticated in a Banbury mixer. They were blended with the low molecular weight elastomer in a GUITTARD mixer with each other and with additional sealant ingredients, as follows:

| INGREDIENT | PHR |
|---|---|
| Homogenizer ("STRUKTOL MS-40") | 42.86 |
| Tackifier ("PICCOPALE 100-5") | 14.28 |
| Anti-oxidant ("NAUGARD DSTDP") | 0.23 |
| Anti-oxidant/Anti-ozonant ("FLEXZONE 11L") | 0.11 |
| Anti-oxidant ("INGANOX 1035") | 0.11 |
| Anti-oxidant ("POLYGARD") | 0.11 |
| Curing agent (Tetraisopropyl Titanate - "TIPT") | 2.52 |
| Blended cold sealant ("WORKAWAY") | 17.82 |

STRUKTOL MS-40 is a mixture of dark aromatic hydrocarbon resins having a specific gravity of 1.0 g/cm$^3$ and a softening point of 55° C. sold by the Struktol Company; PICCOPALE 100-5 is a pale colored aliphatic hydrocarbon resin having a density of 0.97 kg/l at 25° C. and a softening point of 100° C. sold by Hercules Incorporated; NAUGARD DSTDP is distearyl thiodipropionate sold by Uniroyal Chemical Company; FLEXZONE UL is a dark purple liquid blend of substituted p-phenylenediamines having a specific gravity of 1.103 at 38° C. sold by the Uniroyal Chemical Company; IRGANOX 1035 is a light tan colored alkylated phenol sold by the Ciba-Geigy Corporation; POLYGARD is a straw colored viscous liquid of tris-nonylphenyl phosphite containing some mono- and di-nonyl phenyl phosphites sold by the Uniroyal Chemical Company; WORKAWAY is the blend of the high molecular weight elastomer and the low molecular weight elastomer as described on page 20, lines 23 to 26.

The test composition following blending had an uncured Mooney viscosity ML (1+4) 80° F. of 40 and a cured, peak Mooney viscosity of MLP:ML (3+4) 150° F. of 29.

The control composition following blending had an uncured Mooney viscosity ML (1+4) 80° F. of 45 and a cured, peak Mooney viscosity of MLP:ML (3+4) 150° F. of 44.

Tires having a tire size P235/70R15 and a tread width of 7.03 inches were prepared with 3.22 pounds of the test and control sealants per tire. The tires were measured for sealant flow using an NTO test procedure in which the tires were initially run at a speed of 50 mph. The tires were pressurized to 35 psi with air and run at a temperature of 100° F. on a 67 inch test wheel. The speed was then incrementally increased, in 5 mph steps, maintaining each incremental increase for one hour, through 70 mph. The tires were then run for one-half hour at 75 mph, followed by 5 mph incremental increases, each maintained for one-half hour, through 90 mph. The sealant thicknesses were measured before and after each test. The following results were obtained.

TABLE 1

| Distance From CL (Inches) | Sealant Thickness, Inches Test Composition (FN 8121) | | | Sealant Thickness, Inches Control Composition (FN 8120) | | |
|---|---|---|---|---|---|---|
| | Before NTO | After NTO | Difference Af−Bf | Before NTO | After NTO | Difference Af−Bf |
| 3.50" | 0.148 | 0.136 | −0.012 | 0.146 | 0.125 | −0.021 |
| 3.00" | 0.162 | 0.172 | 0.010 | 0.160 | 0.159 | −0.001 |
| 2.75" | 0.164 | 0.180 | 0.016 | 0.162 | 0.170 | 0.008 |
| 2.50" | 0.170 | 0.187 | 0.017 | 0.165 | 0.181 | 0.016 |
| 2.00" | 0.192 | 0.202 | 0.010 | 0.181 | 0.191 | 0.010 |
| 1.50" | 0.162 | 0.195 | 0.033 | 0.166 | 0.186 | 0.020 |
| 1.00" | 0.151 | 0.167 | 0.016 | 0.159 | 0.173 | 0.014 |
| 0.50" | 0.158 | 0.165 | 0.007 | 0.162 | 0.170 | 0.008 |
| CL | 0.169 | 0.174 | 0.005 | 0.169 | 0.177 | 0.008 |
| 0.50" | 0.160 | 0.171 | 0.011 | 0.161 | 0.179 | 0.018 |
| 1.00" | 0.161 | 0.176 | 0.015 | 0.165 | 0.178 | 0.013 |
| 1.50" | 0.171 | 0.180 | 0.009 | 0.176 | 0.186 | 0.010 |
| 2.00" | 0.165 | 0.180 | 0.015 | 0.165 | 0.175 | 0.010 |
| 2.50" | 0.151 | 0.171 | 0.020 | 0.156 | 0.170 | 0.014 |
| 2.75" | 0.149 | 0.169 | 0.020 | 0.152 | 0.163 | 0.011 |
| 3.00" | 0.149 | 0.159 | 0.010 | 0.153 | 0.152 | −0.001 |
| 3.50" | 0.137 | 0.123 | −0.014 | 0.138 | 0.124 | −0.014 |

Rotary Flow: Average thickness decrease at locations 3 and 3.5 inches from CL

The rotary flow, in terms of average thickness decrease at locations 3 and 3.5 inches from the center line, was, for the iron-free test formulation ("ISOLENE 400"), 0.0015 inch, and for the iron-containing control formulation ("DPR 400"), 0.0060 inch. The locations at 3 and 3.5 inches from the center line are the significant locations, for this tire, with regard to sealant flow, since these are the locations where the flow, due to centrifugal force, toward the centerline of the tire, is likely to be the greatest. The results of Table 1 show significantly less rotary flow (75% less rotary flow) for the test composition of the present invention, which is essentially iron-free, compared to the control composition, using a low molecular weight elastomer containing iron. These results were obtained despite the lower viscosities for the iron-free sealant compared to the iron contaminated sealant. The lower viscosities would be expected to give normally more tendency to flow.

EXAMPLE 2

A test sealant composition (F2) was prepared containing, as the low molecular weight elastomer, a liquid synthetic cis-polyisoprene rubber marketed under the trademark "LIR-50". The rubber was found to have a low iron content of 0.97 ppm. This rubber is not chemically modified. However, it may have some hydroxyl groups in the polymer molecule. One analysis showed that it appeared to have a hydroxyl number of about 50 meq/gm. Even though it was not a chemically modified cis-polyisoprene, it was reactive with a titanate curing system.

A control composition (B2) was also prepared. The control composition, in this Example, also used, as the low molecular weight elastomer, the depolymerized natural rubber marketed under the trademark "DPR-400".

The test composition and the control composition had exactly the same formulations, except for the low molecular weight elastomer that was used. The high molecular weight elastomer, in both compositions, was a blend of a medium soft rubber (SXR-20) and a Standard Malaysian rubber (SMR-5), in the ratio of 75 parts SXR-20 to 25 parts SMR-5 (by weight).

The solid natural rubbers were mixed in a Banbury mixer until the viscosity ML(1+4) 100° C. equaled approximately 40. The high and low molecular weight elastomers were blended together in the following proportions:

| | |
|---|---|
| High Molecular Weight Elastomer | 57.14 Parts |
| Low Molecular Weight Elastomer | 42.86 Parts |

The rubbers were blended in a GUITTARD mixer with each other and with additional sealant ingredients, as follows:

| INGREDIENT | PHR |
|---|---|
| Homogenizer ("STRUKTOL MS-40") | 42.86 |
| Tackifier ("PICCOPALE 100-5") | 14.28 |
| Anti-oxidant ("NAUGARD DSTDP") | 0.23 |
| Anti-oxidant/Anti-ozonant ("FLEXZONE IIL") | 0.11 |
| Anti-oxidant ("INGANOX 1035") | 0.11 |
| Anti-oxidant ("POLYGARD") | 0.11 |
| Tetraisopropyl titanate curing agent | 2.57 |

The test composition following blending had an uncured Mooney viscosity ML (1+4) 75° F. of 50 and a cured, peak Mooney viscosity of MLP:ML (3+4) 150° F. of 29.

The control composition following blending had an uncured Mooney viscosity ML (1+4) 75° F. of 68 and a cured, peak Mooney viscosity of MLP:ML (3+4) 150° F. of 39.

Tires having a tire size P225/75R15 and a tread width of 6.28 inches were prepared with 2.71 pounds of the test and control sealants per tire. The tires were measured for sealant flow using the same NTO test of Example 1. The following results were obtained.

TABLE 2

| (2.70 lbs) | | | | | | |
|---|---|---|---|---|---|---|
| Sealant Thickness, Inches Test Composition (F2) | | | | Sealant Thickness, Inches Control Composition (B2) | | |
| Distance From CL (Inches) | Before NTO | After NTO | Difference Af−Bf | Before NTO | After NTO | Difference Af−Bf |
| 3.50" | 0.114 | 0.064 | −0.050 | 0.118 | 0.050 | −0.068 |
| 3.00" | 0.161 | 0.108 | −0.053 | 0.156 | 0.086 | −0.070 |
| 2.75" | 0.173 | 0.136 | −0.037 | 0.153 | 0.109 | −0.044 |
| 2.50" | 0.183 | 0.167 | −0.016 | 0.161 | 0.152 | −0.009 |
| 2.00" | 0.155 | 0.186 | 0.031 | 0.167 | 0.187 | 0.020 |
| 1.50" | 0.161 | 0.176 | 0.015 | 0.151 | 0.200 | 0.049 |
| 1.00" | 0.148 | 0.166 | 0.018 | 0.141 | 0.186 | 0.045 |
| 0.50" | 0.144 | 0.142 | −0.002 | 0.160 | 0.163 | 0.003 |
| CL | 0.145 | 0.144 | −0.001 | 0.150 | 0.160 | 0.010 |
| 0.50" | 0.141 | 0.147 | 0.006 | 0.137 | 0.151 | 0.014 |
| 1.00" | 0.139 | 0.144 | 0.005 | 0.129 | 0.168 | 0.039 |
| 1.50" | 0.145 | 0.151 | 0.006 | 0.151 | 0.187 | 0.036 |
| 2.00" | 0.171 | 0.181 | 0.010 | 0.177 | 0.202 | 0.025 |
| 2.50" | 0.174 | 0.182 | 0.008 | 0.177 | 0.173 | −0.004 |
| 2.75" | 0.166 | 0.157 | −0.009 | 0.162 | 0.145 | −0.017 |
| 3.00" | 0.174 | 0.107 | −0.067 | 0.138 | 0.106 | −0.032 |
| 3.50" | 0.087 | 0.080 | −0.007 | 0.131 | 0.051 | −0.080 |

Rotary Flow: Average thickness decrease at locations 2.75, 3 and 3.5 inches from CL The rotary flow is measured as the average thickness decrease at locations 3.5, 3, 2.75 inches from the center line. For the iron-free test formulations, rotary flow was 0.037 inch, and for the iron-containing control formulation was 0.052 inch. The locations at 3.5, 3 and 2.75 inches from the center line are the significant locations with regard to sealant flow, since these are the locations where the flow, in this tire, due to centrifugal force, toward the centerline of the tire, is likely to be the greatest. The results of Table 2 show significantly less flow for the test composition of the present invention, which is essentially iron-free, compared to the sealant composition using a low molecular weight elastomer containing iron.

EXAMPLE 3

This Example is the same as Example 2, but more sealant weight in the tire was used. The higher sealant weight results in a greater tendency to flow. The test and control compositions were the same as in Example 2. The same size tire was used.

The tires were subjected to the same NTO test as in Example 1. The following Table 3 gives representative test results that were obtained. The Table compares a tire having 3.01 pounds test sealant of the present invention with a tire having 3.01 pounds control sealant.

TABLE 3

| Sealant Thickness, Inches Test Sealant 3.01 lbs. (E1) | | | | Sealant Thickness, Inches Control Sealant 3.01 lbs. (A1) | | |
|---|---|---|---|---|---|---|
| Distance From CL | Before NTO | After NTO | Difference Af−Bf | Before NTO | After NTO | Difference Af−Bf |
| 3.50" | 0.114 | 0.059 | −0.055 | 0.161 | 0.080 | −0.081 |
| 3.00" | 0.176 | 0.112 | −0.064 | 0.188 | 0.131 | −0.057 |
| 2.75" | 0.187 | 0.142 | −0.045 | 0.202 | 0.164 | −0.038 |
| 2.50" | 0.201 | 0.180 | −0.021 | 0.185 | 0.201 | 0.016 |
| 2.00" | 0.188 | 0.215 | 0.027 | 0.164 | 0.212 | 0.048 |
| 1.50" | 0.183 | 0.198 | 0.015 | 0.161 | 0.195 | 0.034 |

TABLE 3-continued

| | Sealant Thickness, Inches Test Sealant 3.01 lbs. (E1) | | | Sealant Thickness, Inches Control Sealant 3.01 lbs. (A1) | | |
|---|---|---|---|---|---|---|
| Distance From CL | Before NTO | After NTO | Difference Af−Bf | Before NTO | After NTO | Difference Af−Bf |
| 1.00" | 0.183 | 0.181 | −0.002 | 0.131 | 0.161 | 0.030 |
| 0.50" | 0.179 | 0.174 | −0.005 | 0.125 | 0.142 | 0.017 |
| CL | 0.175 | 0.163 | −0.012 | 0.137 | 0.145 | 0.008 |
| 0.50" | 0.182 | 0.168 | −0.014 | 0.148 | 0.158 | 0.010 |
| 1.00" | 0.150 | 0.165 | 0.015 | 0.144 | 0.168 | 0.024 |
| 1.50" | 0.176 | 0.197 | 0.021 | 0.152 | 0.196 | 0.044 |
| 2.00" | 0.187 | 0.201 | 0.014 | 0.182 | 0.225 | 0.043 |
| 2.50" | 0.195 | 0.184 | −0.011 | 0.205 | 0.194 | −0.011 |
| 2.75" | 0.199 | 0.136 | −0.063 | 0.197 | 0.163 | −0.034 |
| 3.00" | 0.203 | 0.088 | −0.115 | 0.199 | 0.099 | −0.100 |
| 3.50" | 0.105 | 0.057 | −0.048 | 0.177 | 0.037 | −0.140 |

Rotary Flow: Average thickness decrease at locations 3.50, 3.00, and 2.75"
Test sealant = −0.065"
Control sealant = −0.075"

Similar results were obtained as those of Example 2. The rotary flow and average thickness decrease at locations 3.5, 3 and 2.75 inches from the center line for the ironfree test formulations varied from 0.065 inch to 0.070 inch, and for the iron-containing control formulations, from 0.067 to 0.075 inch. That is, there was significantly less rotary flow with the test sealant than with the control sealant.

The improvements in these results are particularly significant when taking into consideration the fact that the cured and uncured viscosities of the "LIR-50" containing sealant were lower than those of the "DPR-400" containing sealant. The lower viscosities should result in a greater tendency to flow.

EXAMPLE 4

This Example illustrates the advantages of the present invention in a laminate formulation, such as disclosed in U.S. Pat. No. 4,913,209, using a peroxide cure system.

A sealant test composition according to the present invention was prepared and compared with a control composition. Both compositions contained 61.25 parts high molecular weight rubber and 38.75 parts low molecular weight rubber. The high molecular weight rubber was a blend of a medium soft rubber (SXR-20) and a Standard Malaysian rubber (SMR-5), in the ratio of 75 parts SXR-20 to 25 parts SMR-5.

The low molecular weight rubber in the test composition was the synthetic polyisoprene of Example 2 marketed under the trademark "LIR-50", and in the control composition, the depolymerized natural rubber DPR-400.

To separate batches of the above test and control compositions, the following ingredients were added:

| Ingredient | PHR* |
|---|---|
| Homogenizer ("STRUKTOL MS-40") | 63.92 |
| Tackifier ("PICCOPALE (100S)") | 21.5 |
| Anti-oxidant ("NAUGARD DSTDP") | 0.24 |
| Anti-oxidant/Anti-ozonant ("FLEXZONE 11L") | 0.12 |
| Anti-oxidant ("INGANOX 1035") | 0.12 |
| Anti-oxidant ("POLYGARD") | 0.12 |
| Peroxide Curing Agent ("Dicup 40C") | 1.11 |

"Dicup 40C" is dicumyl peroxide on precipitated calcium carbonate sold by Hercules Incorporated.

Webs were provided for construction of P215/75R15 tires. The sealant formulations were applied to the webs following the procedure set forth in U.S. Pat. No. 4,913,209. The disclosure of this patent is incorporated by reference herein. Both the sealing compositions were extruded as layers of about nine inches in width onto the inner liners. A polyvinyl alcohol detackifier was sprayed onto the top of the sealant-web composite and dried to facilitate handling during tire building and curing. The Mooney viscosities of the test and control compositions were:

| | Test | Control |
|---|---|---|
| AFDC (1 + 4) 75° F. | 86 | 76 |
| MLP (3 + 4) 150° F. | 26 | 26 |

The laminates were then used to build tires. Four tires were constructed, two containing the test composition, and two containing the control composition. All of the tires had identical cure cycles and other treatment.

The tires were then subjected to the NTO test of Example 1. The following results were obtained.

TABLE 4

| | Test Sealant Thickness Inches (C2) | | | Control Sealant Thickness, Inches (B2) | | |
|---|---|---|---|---|---|---|
| Distance From CL | Before NTO | After NTO | Difference Af−Bf | Before NTO | After NTO | Difference Af−Bf |
| 3.00" | 0.058 | 0.022 | −0.036 | 0.077 | 0.034 | −0.043 |
| 2.75" | 0.111 | 0.032 | −0.079 | 0.127 | 0.045 | −0.082 |
| 2.50" | 0.132 | 0.047 | −0.085 | 0.134 | 0.054 | −0.080 |
| 2.00" | 0.154 | 0.166 | 0.012 | 0.138 | 0.172 | 0.034 |
| 1.50" | 0.125 | 0.159 | 0.034 | 0.139 | 0.150 | 0.011 |
| 1.00" | 0.152 | 0.152 | 0.000 | 0.159 | 0.178 | 0.019 |
| 0.50" | 0.148 | 0.150 | 0.002 | 0.174 | 0.170 | −0.004 |
| CL | 0.151 | 0.150 | −0.001 | 0.169 | 0.176 | 0.007 |
| 0.50" | 0.166 | 0.160 | −0.006 | 0.168 | 0.183 | 0.015 |
| 1.00" | 0.183 | 0.164 | −0.019 | 0.187 | 0.204 | 0.017 |
| 1.50" | 0.192 | 0.170 | −0.022 | 0.197 | 0.209 | 0.012 |
| 2.00" | 0.200 | 0.198 | −0.002 | 0.182 | 0.215 | 0.033 |
| 2.50" | 0.129 | 0.170 | 0.041 | 0.144 | 0.075 | −0.069 |
| 2.75" | 0.108 | 0.035 | −0.073 | 0.115 | 0.036 | −0.079 |
| 3.00" | 0.056 | 0.024 | −0.032 | 0.058 | 0.027 | −0.031 |

Rotary Flow: Average thickness decrease at locations 2.5, 2.75, and 3.0 from CL
Test Sealant = −0.044"
Control Sealant = −0.064"

From Table 4, it can be seen that the primary changes in the sealant thickness were at the edges of the extruded sealant, as in Examples 1-3. In both the control and test compositions, the sealant thicknesses remained substantially unchanged, except for the outer three measurements at each edge. At the edges, the sealant was forced to the center of the tire by the centrifugal force to which the tires were subjected. The flow was much less for the sealant which was iron-free compared to the sealant containing iron. The average thickness decrease was 0.044 inch for the iron-free sealant compared to 0.064 inch for the sealant containing iron.

EXAMPLE 5

This Example employs, as the test composition (El) a blend of 95 weight parts "LIR-50" (synthetic cis-polyisoprene which has not been chemically modified) and 5 weight parts "LIR-403" (carboxylated synthetic cispolyisoprene having 3 carboxyl (COOH) groups per molecule). Both compounds are essentially iron-free. The test composition (E1) was compared with a control composition (B1) which contained "DPR-400". "DPR-400" is high in iron content. The tire size was P205/75R14. Sealant weights were not measured, but the target weight was 2.48 lbs.

The test and control compositions were the same except for the composition of the low molecular weight elastomer.

The high molecular weight elastomer was blend 42.85 phr of a medium soft rubber, 14.28 phr of SMR-5, and 0.07 phr "RENACIT VII". The low molecular weight elastomer in the control composition (B1) was 42.86 phr "DPR-400". The low molecular weight elastomer in the test composition (E1) was 40.72 phr of "LIR-50" and 2.14 phr of "LIR-403". The curing agent was TIPT in the same proportion as in Example 1. Other ingredients, the homogenizer, tackifier, and antioxidants were the same as in Example 1, in the same proportions, except that the compositions contained no cold sealant. The tires were subjected to the same NTO test as in Example 1. The results are shown in the following Table 5.

TABLE 5

| | Sealant Thickness Inches Test Composition (E1) | | | Sealant Thickness, Inches Control Composition (B1) | | |
|---|---|---|---|---|---|---|
| Distance From CL | Before NTO | After NTO | Difference Af−Bf | Before NTO | After NTO | Difference Af−Bf |
| 3.00" | 0.121 | 0.105 | −0.016 | 0.098 | 0.065 | −0.033 |
| 2.75" | 0.161 | 0.152 | −0.009 | 0.129 | 0.093 | −0.036 |
| 2.50" | 0.174 | 0.192 | 0.018 | 0.144 | 0.126 | −0.018 |
| 2.00" | 0.161 | 0.191 | 0.030 | 0.147 | 0.165 | 0.018 |
| 1.50" | 0.190 | 0.195 | 0.005 | 0.160 | 0.179 | 0.019 |
| 1.00" | 0.162 | 0.161 | −0.001 | 0.179 | 0.187 | 0.008 |
| 0.50" | 0.141 | 0.155 | 0.014 | 0.167 | 0.170 | 0.003 |
| CL | 0.156 | 0.178 | 0.022 | 0.173 | 0.169 | −0.004 |
| 0.50" | 0.149 | 0.166 | 0.017 | 0.158 | 0.161 | 0.003 |
| 1.00" | 0.164 | 0.208 | 0.044 | 0.151 | 0.188 | 0.037 |
| 1.50" | 0.190 | 0.206 | 0.016 | 0.187 | 0.210 | 0.023 |
| 2.00" | 0.179 | 0.205 | 0.026 | 0.191 | 0.210 | 0.019 |
| 2.50" | 0.183 | 0.202 | 0.019 | 0.185 | 0.180 | −0.005 |
| 2.75" | 0.179 | 0.171 | −0.008 | 0.183 | 0.145 | −0.038 |
| 3.00" | 0.178 | 0.132 | −0.046 | 0.180 | 0.110 | −0.070 |

The average thickness decrease, taken at 2.5, 2.75 and 3 inches from the center line, was 0.013 inch for the test composition (E1), and 0.033 inch for the control composition (B1). The tire E1 had 61% less rotary flow than the tire B1. Based on the above results and other observations, a preferred composition of the present invention comprises a blend in which a portion of the low molecular weight elastomer is a synthetic cis-polyisoprene which is chemically modified.

From the above description of the invention, those skilled in the art will perceive improvements, changes and modifications. Such improvements, changes and modifications within the skill of the art are intended to be covered by the appended claims.

Having described the invention, the following is claimed:

1. A sealant for a pressurized article comprising:
   a high molecular weight elastomer;
   a low molecular weight liquid elastomer; and
   a cross-linking agent;
   said low molecular weight liquid elastomer being substantially free of iron.

2. The sealant of claim 1 wherein said low molecular weight liquid elastomer has less than ten ppm iron.

3. The sealant of claim 1 wherein at least a portion of said low molecular weight liquid elastomer is chemically modified having hydroxyl, carboxyl or amino groups.

4. The sealant of claim 3 wherein said cross-linking agent is a titanate ester.

5. The sealant of claim 1 wherein said low molecular weight liquid elastomer is selected from the group consisting of a heat depolymerized natural rubber; synthetic cis-polyisoprene polymerized to a low molecular weight; liquid depolymerized butyl rubber; liquid polybutene; and liquid EPDM.

6. The sealant of claim 5 wherein said cross-linking agent is a titanate ester, a quinoid curing system, an organic peroxide, or a sulfur curing system.

7. The sealant of claim 1 wherein said low molecular weight elastomer has a molecular weight in the range of 2,000 to 100,000.

8. The sealant of claim 1 comprising 50-90 parts by weight high molecular weight elastomer and 10-50 parts by weight low molecular weight elastomer.

9. The sealant of claim 1 wherein said low molecular weight elastomer is a blend of a polyisoprene which is not chemically modified so as to have reactive groups and a synthetic cis-polyisoprene which is chemically modified and has reactive groups, said sealant further comprising a curing amount of a titanate ester cross-linking agent.

10. The sealant of claim 9 wherein said low molecular weight elastomer comprises about 2%-5% by weight synthetic carboxylated cis-polyisoprene based on the total weight of the low molecular weight elastomer.

11. The sealant of claim 10 wherein said carboxylated cis-polyisoprene comprises about three carboxyl groups per molecule.

12. A sealant for a high pressure tubeless tire comprising:
   a high molecular weight elastomer;
   a low molecular weight liquid elastomer; and
   a titanate ester curing agent;
   said low molecular weight elastomer being a blend of (a) a polyisoprene which is essentially free of iron and is not chemically modified so as to have reactive groups, and (b) about 2%-5%, based on the total weight of the blend, of a partially polymerized cis-polyisoprene which is chemically modified and has free carboxyl groups capable of reacting with said titanate ester, said partially polymerized cispolyisoprene having about three (3) carboxyl groups per molecule and also being substantially free of iron.

13. The sealant of claim 12 having a cured peak Mooney viscosity MLP:ML (3+4) at 150° F. in the range of 20 to 70.

14. A high pressure tire comprising the sealant of claim 1.

* * * * *